United States Patent [19]

Coma Juliá

[11] Patent Number: 4,587,846
[45] Date of Patent: May 13, 1986

[54] MEASURING DEVICE FOR MEDICINAL PRODUCTS IN POWDER OR GRANULAR FORM

[76] Inventor: Concepción Coma Juliá, Ganduxer 22, Barcelona, Spain

[21] Appl. No.: 644,813

[22] Filed: Aug. 27, 1984

[30] Foreign Application Priority Data

Mar. 7, 1984 [ES] Spain ........................ 278.014

[51] Int. Cl.⁴ .................... G01F 19/00; G01N 5/00
[52] U.S. Cl. ..................... 73/426; 116/308; 215/366
[58] Field of Search ............ 73/426, 427; 215/365

[56] References Cited

U.S. PATENT DOCUMENTS

| | | | |
|---|---|---|---|
| 2,198,256 | 4/1940 | Levy | 73/427 X |
| 3,461,728 | 8/1969 | Paoli | 73/426 |
| 3,530,722 | 9/1970 | Miller | 73/427 |
| 4,062,228 | 12/1977 | Peak | 73/427 |
| 4,246,789 | 1/1981 | Olds | 73/427 |

FOREIGN PATENT DOCUMENTS

| | | | |
|---|---|---|---|
| 0607493 | 1/1932 | Fed. Rep. of Germany | 73/426 |
| 1245712 | 4/1902 | France | 73/426 |

Primary Examiner—Daniel M. Yasich
Attorney, Agent, or Firm—Scully, Scott, Murphy & Presser

[57] ABSTRACT

A measuring device for medicinal products in powder or granular form comprising a clear transparent tubular body portion closed at one end and extended at the other end thereof with an integral outwardly tapering hopper-like portion. The tubular body portion is provided with graduation marks indicating the weight of active substance contained in the medicinal product, the volume of which is equal to the volume of the tubular body portion comprised between the corresponding mark and the inner surface of the closed end. The tubular body portion may be attached via the closed end thereof to a stand capable of serving as a base supporting the measuring device in the vertical position thereof.

8 Claims, 7 Drawing Figures

MEASURING DEVICE FOR MEDICINAL PRODUCTS IN POWDER OR GRANULAR FORM

BACKGROUND OF THE INVENTION

1. Field of the Invention

This invention relates to a measuring device for powdered or granular medicinal products.

As is known, medicinal products regularly comprise at least one active substance generally accompanied by one or more excipients and possibly other substances such as sweeteners, binders and the like. Such medicinal products are frequently supplied to the user in powder or granular form; the granules are at times so small that they may be termed microgranules.

Such medicinal products are also frequently supplied to the user in amounts larger than the necessary dose prescribed by the physician for each case. The problem then arises of measuring the necessary dose and such measurement must be made in terms of the active substance of the drug.

2. Summary of the Invention

For this purpose, there has been devised a measuring device fundamentally characterised in that it comprises a clear transparent tubular body portion closed at one end and extended at the other end thereof with an integral outwardly tapering hopper-like portion, said tubular body portion being provided with graduation marks indicating the weight of active substance contained in the medicinal product, the volume of which is equal to the volume of the tubular body portion comprised between the corresponding mark and the inner surface of the closed end.

BRIEF DESCRIPTION OF THE DRAWINGS

There are described below preferred embodiments of the invention, with reference to the attached drawings in which.

DESCRIPTION OF THE PREFERRED EMBODIMENTS

Figure 1:
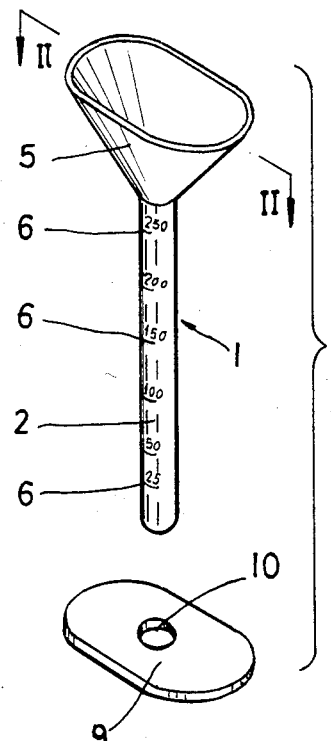
FIG. 1 is an exploded perspective view of the measuring device of the invention and of a stand therefor.
Figure 2:
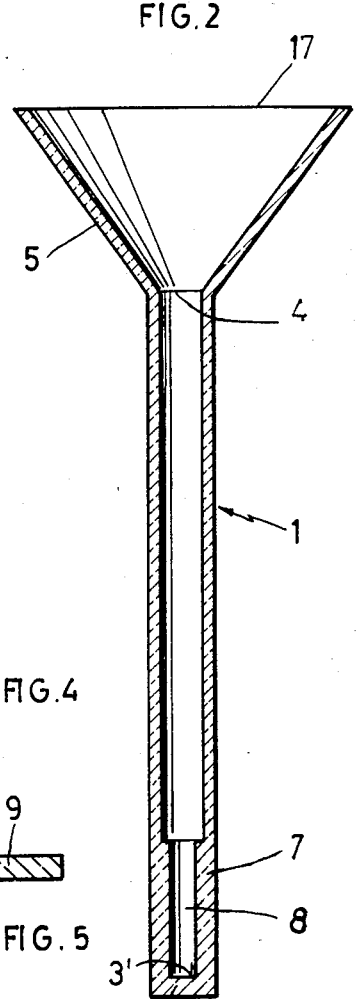
FIG. 2 is an axial cross sectional view, on a larger scale, on the line II—II of FIG. 1, the measuring device being provided with a lower portion having a reduced section cavity.

The measuring device 1 for medicinal products in powder or granular form comprises a clear transparent tubular body portion 2 with an end 3 closing it, determining the bottom 3' of the measuring device.

At the other end 4 thereof, the tubular body portion is extended by a portion 5 outwardly tapering to form a hopper. Said portion 5 is integral with the tubular body portion 2, whereby said hopper portion 5 is also clear transparent.

The tubular body portion 2 is provided with graduation marks 6 and these marks indicate the weight of active substance contained in the particular medicinal product, the volume of which is equal to the volume of the tubular body portion comprised between the corresponding mark 6 and the bottom 3' or inner surface of the closed end 3.

Figure 3:
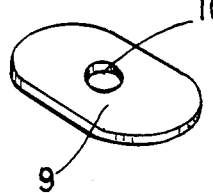
FIG. 3 is an axial cross section view of the closed end of the measuring device, with said reduced section cavity, in comparison with a measuring scale.

The lower portion 7 of the tubular body portion, that is, the portion closest to the closed end 3, may be provided with a cavity 8 having a smaller section that the rest of the tubular body portion; thus a greater accuracy in the measurement of small doses, wherein one same absolute deviation would cause a difference having a greater relative importance, is obtained. In the illustrated embodiment, the smaller section cavity 8 is produced by a thickening of the walls. In FIG. 3 it is to be seen how the scale E running from the bottom 3' has a larger number of divisions in the portion corresponding to the lower portion 7.

It is also possible to provide the measuring device with a stand 9 capable of being used as a base for supporting the measuring device in the vertical position thereof. This stand may be removeable, like the one shown in the drawing where a recess 10 for snugly housing the end 3 is to be seen, or said stand may be integral with the measuring device.

Figure 4:
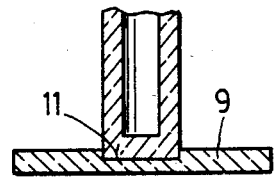
FIGS. 4 to 7 are various axial sectional views of the attachment of the measuring device to the stand thereof.
Figure 5:
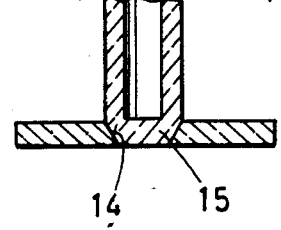
Figure 6:
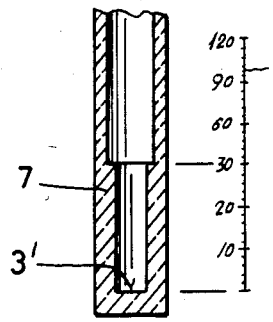
Figure 7:
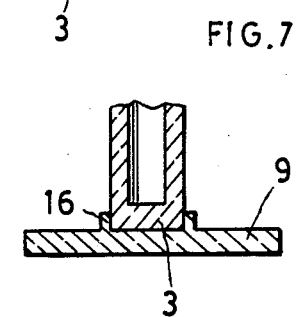

When the stand 9 is not integral with the measuring device 1, they may be attached to each other in several ways. According to FIG. 4 the stand 9 is provided with a recess 11 which does not extend through the full thickness of the stand and is adapted to receive the end 3. In FIG. 5, there is to be seen a cylindrical orifice 12 having a smaller diameter than that of the tube and the latter is provided with a tubular projection 13 which engages said orifice. FIG. 6 shows a joint in which the stand 9 is provided with a frustoconical orifice in which there is engaged the also frustoconical end of the tube. Finally, FIG. 7 shows a stand 9 having an annular shoulder 16 which engages the end 3 of the tube.

Said measuring device is usually contained in the same box as the medicinal product, whereby it is of interest that it should not be disproportionatly large. Therefore, the mouth 17 of the hopper 5 is preferably rectangular with the shorter sides rounded preferably in the form of perfect arcs of a circle. For the same purpose, when the stand 9 is provided, this has a perimeter equal to that of the said mouth 17. Furthermore, in the vertical position in which the stand and the measuring device are attached to each other, it is preferable for the perimeter of said stand to be substantially an orthogonal projection of the perimeter of said mouth 17.

What I claim is:

1. A measuring device for medicinal products in powder or granular form comprising:

a clear transparent tubular body portion having a closed end and an open end, said tubular body portion having an inner cavity extending from said open end to a bottom surface defined by an inner surface of said closed end, said cavity having an upper portion of a constant predetermined diameter and a lower portion of a constant diameter smaller than the predetermined diameter of said upper portion;

an integral outwardly tapering hopper portion extending at the open end of said tubular body portion;

a stand removably attached to the closed end of said tubular body portion for supporting said tubular body portion in a vertical position; and said tubular body portion being provided with graduation marks calibrated such that the volume of the cavity, as indicated by the graduation marks, corresponds to the weight of active substance contained in the medicinal product, the graduation marks on said lower portion having a greater number of divisions to provide a greater accuracy of measurement.

2. The measuring device of claim 1, wherein the portion of the tubular body portion closest to the closed end is provided with a cavity of smaller section than the rest of the tubular body portion.

3. The measuring device of claim 1, wherein the mouth of the hopper portion and the stand have the same perimeter.

4. The measuring device of claim 3, wherein the perimeter of said mouth of the hopper portion and of said stand is a rectangle, the shorter sides of which are replaced by arcs of a circle.

5. The measuring device of claim 4, wherein the perimeter of said stand is substantially an orthogonal projection of the perimeter of said mouth.

6. A measuring device for medicinal products in powder or granular form comprising:
- a clear transparent tubular body portion having a closed end and an open end, said tubular body portion having an inner cavity extending from said open end to a bottom surface defined by an inner surface of said closed end, said tubular body portion having a cavity portion of a smaller diameter nearest to the closed end than the diameter of said extending inner cavity;
- an integral outwardly tapering hopper portion extending at the open end of said tubular body portion, said outwardly tapering hopper portion having a mouth with a substantially rectangular perimeter, the shorter sides of said mouth being circular arcs;
- a stand removably attached to the closed end of said tubular body portion for supporting said tubular body portion in a vertical position, said stand having a substantially rectangular perimeter, the shorter sides of said stand being circular arcs; and
- said tubular body portion being provided with graduation marks calibrated such that the volume of the cavity, as indicated by the graduation marks, corresponds to the weight of active substance contained in the medicinal product.

7. The measuring device of claim 6, wherein the mouth of the hopper portion and the stand have the same perimeter.

8. The measuring device of claim 6, wherein the perimeter of said stand is substantially an orthogonal projection of the perimeter of said mouth.

* * * * *